US 6,625,193 B2

(12) United States Patent
Vetrovec

(10) Patent No.: US 6,625,193 B2
(45) Date of Patent: *Sep. 23, 2003

(54) SIDE-PUMPED ACTIVE MIRROR SOLID-STATE LASER FOR HIGH-AVERAGE POWER

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 89 days.

This patent is subject to a terminal disclaimer.

(21) Appl. No.: 09/767,202

(22) Filed: Jan. 22, 2001

(65) Prior Publication Data

US 2002/0097769 A1 Jul. 25, 2002

(51) Int. Cl.[7] .............................................. H01S 3/091
(52) U.S. Cl. ........................... 372/70; 372/35; 372/72; 372/75
(58) Field of Search .............................. 372/35, 72, 70, 372/71, 34

(56) References Cited

U.S. PATENT DOCUMENTS

| | | |
|---|---|---|
| 3,631,362 A | 12/1971 | Almasi et al. |
| 4,029,400 A | 6/1977 | Eitel |
| 4,357,704 A | 11/1982 | Koechner |
| 4,657,358 A | 4/1987 | Anthony et al. |
| 4,837,771 A | 6/1989 | Baer |
| 4,849,036 A | 7/1989 | Powell et al. |
| 4,944,580 A | 7/1990 | MacDonald et al. |
| 5,335,237 A | 8/1994 | Zapata |
| 5,425,044 A * | 6/1995 | Schlie et al. ............... 372/70 |
| 5,441,803 A | 8/1995 | Meissner |
| 5,553,088 A | 9/1996 | Brauch et al. |
| 5,563,899 A | 10/1996 | Meissner et al. |
| 5,579,333 A | 11/1996 | Neil et al. |
| 5,610,751 A | 3/1997 | Sweeney et al. |
| 5,661,738 A | 8/1997 | Yasui et al. |
| 5,699,372 A | 12/1997 | Okazaki |

(List continued on next page.)

FOREIGN PATENT DOCUMENTS

DE     42 39 653 A1     6/1994

OTHER PUBLICATIONS

Department of Defense—Report of the High Energy Laser Executive Review Panel entitled "Department of Defense Laser Master Plan" dated Mar. 24, 2000.

"Diode–Pumped Active Mirror Amplifier for High–Average Power" Proceedings of the International Conference on Lasers 2000, Albuquerque, NM, USA Dec. 4–8, 2000, pp. 776–783, XP008006202 2001, McLean, VA, USA, STS Press, USA the whole document.

Primary Examiner—Albert W. Paladini
(74) Attorney, Agent, or Firm—Harness Dickey & Pierce P.L.C.

(57) ABSTRACT

Apparatus and method for achieving improved performance in a solid-state laser. The solid-state laser apparatus preferably uses a laser gain medium in the shape of a disk wherein optical pump radiation is injected into the peripheral edge of the disk. In the preferred embodiment the laser gain medium is provided with optical coatings for operation in the active mirror configuration. Furthermore, the laser gain medium is pressure-clamped to a rigid, cooled substrate, which allows it to maintain a prescribed shape even when experiencing significant thermal load. A cooling medium can be provided to a heat exchanger internal to the substrate and/or flowed through the passages on the substrate surface, thereby directly cooling the laser gain medium. Sources of optical pump radiation are placed around the perimeter of the gain medium. Tapered ducts may be disposed between the sources and the gain medium for the purpose of concentrating optical pump radiation. With the proper choice of laser gain medium doping, pump source divergence and geometry, a uniform laser gain is achieved across large portions of the gain medium.

40 Claims, 10 Drawing Sheets

U.S. PATENT DOCUMENTS

| | | |
|---|---|---|
| 5,703,893 A | 12/1997 | Komiyama et al. |
| 5,796,761 A | 8/1998 | Injeyan et al. |
| 5,832,015 A | 11/1998 | Goto et al. |
| 5,846,638 A | 12/1998 | Meissner |
| 5,856,996 A | 1/1999 | Durkin et al. |
| 5,872,803 A | 2/1999 | Mori et al. |
| 5,872,804 A | 2/1999 | Kan et al. |
| 5,875,206 A | 2/1999 | Chang |
| 5,903,583 A * | 5/1999 | Ullman et al. ............. 372/35 |
| 5,936,984 A | 8/1999 | Meissner et al. |
| 5,978,407 A | 11/1999 | Chang et al. |
| 6,055,260 A | 4/2000 | Byren et al. |
| 6,192,061 B1 * | 2/2001 | Hart et al. ............. 372/87 |
| 6,339,605 B1 * | 1/2002 | Vetrovec ............. 372/35 |

\* cited by examiner

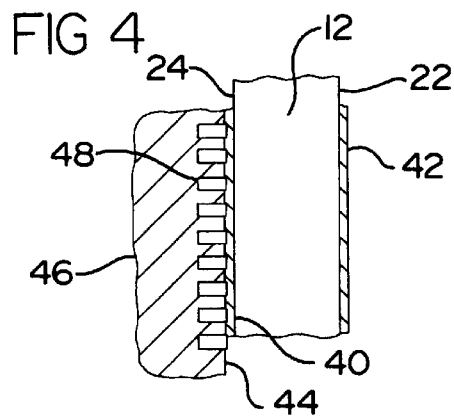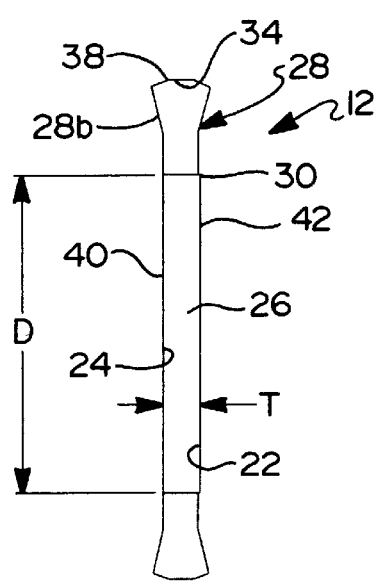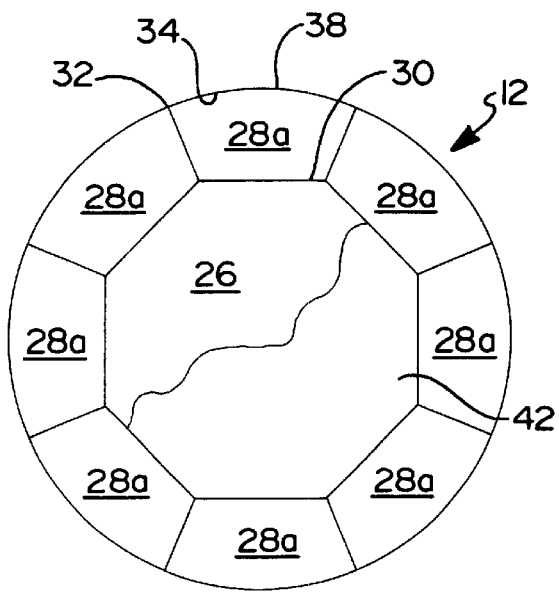

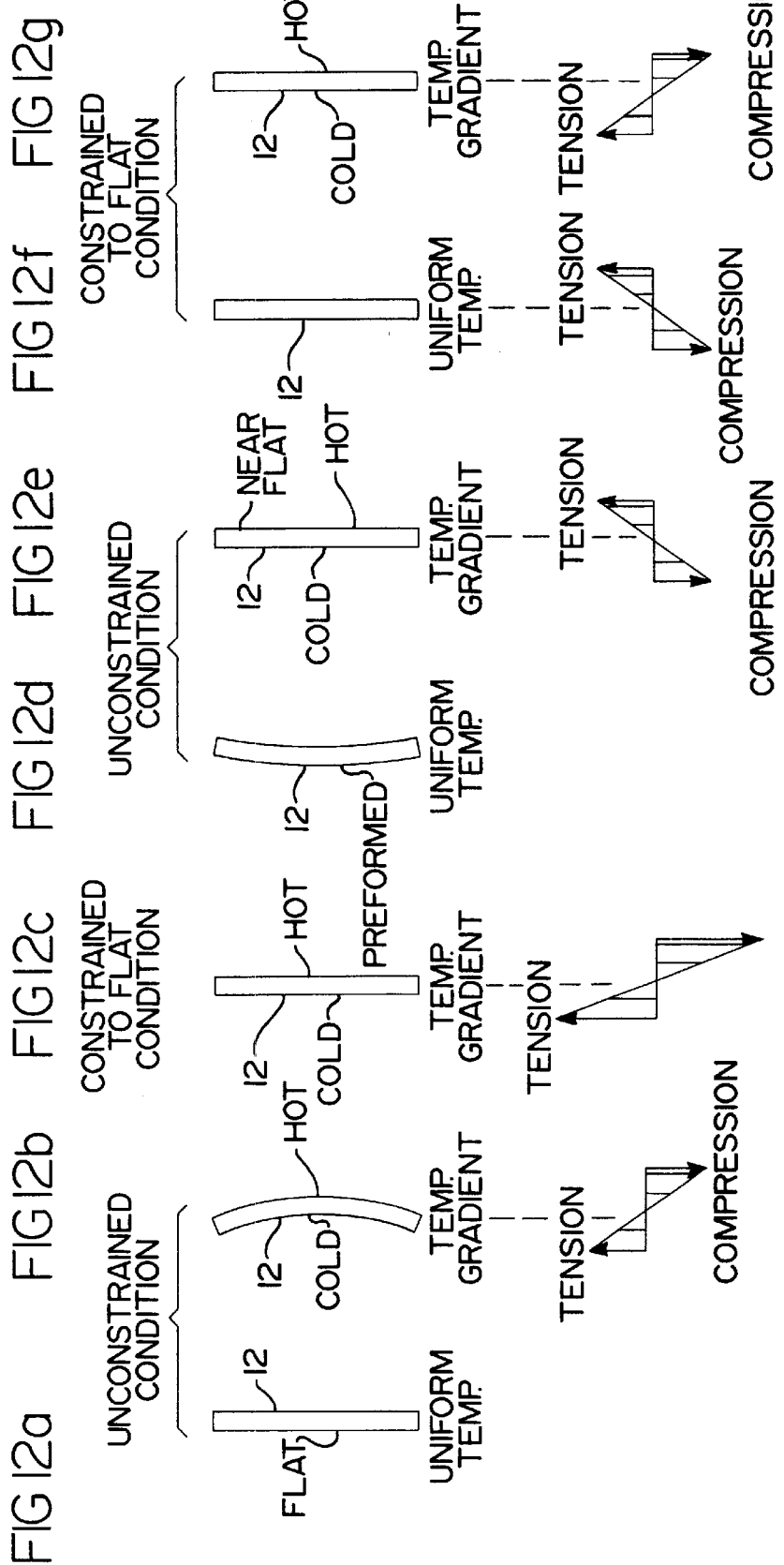

SIDE-PUMPED ACTIVE MIRROR SOLID-STATE LASER FOR HIGH-AVERAGE POWER

BACKGROUND OF THE INVENTION

1. Technical Field

This invention relates to solid-state lasers, and more particularly to an active mirror amplifier laser having a side-pumped gain medium disposed in contact with an actively cooled substrate.

2. Background of the Invention

In solid-state lasers (SSL), optical pumping generates a large amount of heat within a laser medium and increases its temperature. Continuous operation of the laser, therefore, requires removal of the waste heat by cooling selected surfaces of the laser medium. Because SSL media typically have a low thermal conductivity, a significant thermal gradient is created between the hot interior and the cooled outer surfaces. This causes a gradient in the index of refraction, mechanical stresses, depolarization, detuning, and other effects, with likely consequences of degraded beam quality, reduced laser power, and possibly a fracture of the SSL medium. Such effects present a major challenge to scaling of SSLs to high-average power (HAP). Pumping by semiconductor laser diodes, which was introduced in the last decade, greatly reduces the amount of waste heat and paves the way for development of a HAP-SSL with good beam quality. Such lasers are expected to make practical new industrial processes such as precision laser machining with applications ranging from deep penetration welding to processing of aerospace materials.

It has been long recognized that optical distortions caused by transverse temperature gradients (i.e., perpendicular to laser beam axis) degrade beam quality. A class of SSL known as "active mirror amplifier" (AMA) originally disclosed by Almasi et al. in U.S. Pat. No. 3,631,362 (1971) has shown effective reduction of transverse temperature gradients and demonstrated the generation of a laser output with very good beam quality. See, for example, J. Abate et al., "Active Mirror: A large-aperture Medium Repetition Rate Nd: Glass Amplifier," Appl. Opt. Vol. 20, no. 2, 351–361 (1981) and D. C. Brown et al., "Active-mirror Amplifier: Progress and Prospects," IEEE J. of Quant. Electr., vol. 17, no. 9, 1755–1765 (1981).

In the classical AMA concept, a large aspect ratio, edge-suspended, Nd-Glass disk (or slab) several centimeters thick is pumped by flashlamps and liquid-cooled on the back face. However, this device is not suitable for operation at HAP because of poor heat removal and resulting thermo-mechanical distortion of the edge-suspended disk. Previous attempts to mitigate these problems and increase the average power output of an AMA were met with encouraging but limited results. In recent years, the AMA concept has been a revived in the form of a "thin disk laser" introduced by Brauch et al. in U.S. Pat. No. 5,553,088. The thin disk laser uses a gain medium disk which is several millimeters in diameter and 200–400 $\mu$m in thickness soldered to a heat sink. See, for example, A. Giesen et al., "Scalable concept for diode-pumped high-power lasers," Appl. Phys. B vol. 58, 365–372 (1994). The diode-pumped Yb:YAG thin disk laser has demonstrated laser outputs approaching 1 kW average power and with beam quality around 12 times the diffraction limit. See, for example, C. Stewen et al., "1-kW CW Thin Disk Laser," IEEE J. of Selected Topics in Quant. Electr., vol. 6, no. 4, 650–657 (July/August 2000). Another variant of the thin disk laser can be found in L. Zapata et al., "Composite Thin-Disk Laser Scalable To 100 kW Average Power Output and Beyond," in Technical Digest from the Solid-State and Diode Laser Technology Review held in Albuquerque, N.Mex., Jun. 5–8, 2000.

The applicant's patent application Ser. No. 99/505,399 titled Active Mirror Amplifier System and Method for a High-Average Power Laser System, hereby incorporated by reference, discloses a new AMA concept, which is suitable for operation at high-average power. The invention uses a large aperture laser gain medium disk about 2.5 mm in thickness and with a diameter typically between 5 cm and 15 cm mounted on a rigid, cooled substrate. Note that the disk thickness in this AMA concept is about 10 times less than in the classical AMA and about 10 times more than in the thin disk laser. The substrate contains a heat exchanger and microchannels on the surface facing the laser medium disk. The disk is attached to the substrate by a hydrostatic pressure differential between the surrounding atmosphere and the gas or liquid medium in the microchannels. This novel approach permits thermal expansion of the laser medium disk in the transverse direction while maintaining a thermally loaded disk in a flat condition. The teachings of this patent application provide numerous advantages over prior art SSL and allow generation of near diffraction limited laser output at very high-average power from a relatively compact device.

The above-mentioned patent application Ser. No. 99/505,399 also teaches two principal methods for providing pump radiation into the AMA disk, namely 1) through the large (front or back) face of the disk, or 2) through the sides (edges) of the disk. The former method is often referred to as "face pumping" and is further elaborated on in J. Vetrovec, "Diode-pumped Active Mirror Amplifier For High-Average Power," in proc. from Lasers 2000 Conference held in Albuquerque, N.Mex., Dec. 4–8, 2000. This publication describes a face-pumped AMA with pump radiation from a diode array injected into the laser gain medium through an optically transparent substrate.

To make face pumping efficient, the AMA disk must absorb a large fraction of the pump radiation injected. This condition can be met by a certain combination of disk thickness and doping density of lasant ions. However, in many cases of interest it is impractical (or undesirable) to make the necessary increase in disk thickness or lasant doping level. For example, doping a yttrium-aluminum garnet (YAG) crystal with neodymium ($Nd^{3+}$) ions beyond about 1.5% of atomic concentration is known to reduce the fluorescence time, broaden the line-width, and excessively stress the crystal due to a mismatch in size between the Nd atoms and yttrium atoms (the latter being replaced in crystal lattice). Increasing the disk thickness is often undesirable as it also increases thermal impedance and leads to higher thermal stresses. These considerations limit design parameters of face-pumped AMA to a relatively narrow regime. Face pumping is also impractical in conjunction with ytterbium ($Yb^{3+}$) lasant ions, which require very high pump intensities to overcome re-absorption of laser radiation by the ground energy state. For example, a 2.5 mm-thick AMA disk made of YAG crystal would require about 10% atomic doping concentration of $Yb^{3+}$ ions to absorb 90% of face-injected pump radiation in two passes. Such a high Yb concentration would require an unreasonably high pump intensity of about 34 $kW/cm^2$ to induce medium transparency at 1.03 $\mu$m wavelength, and several times this level to efficiently operate the laser. In this situation, injecting the pump radiation into the disk side (i.e., edge or perimeter) becomes an attractive alternative. Side-pumping takes advantage of the long absorption path (approximately same dimension as the diameter of the gain medium disk), which permits doping the disk with a reduced concentration of lasant ions. This in turn reduces requirements for pump radiation intensity.

While side-pumping may be a suitable method for delivering pump radiation, several associated technical challenges still need to be overcome, such as: 1) delivering and concentrating pump radiation into the relatively small area around the disk perimeter; 2) preventing overheating of the disk in the areas where the pump radiation is injected; 3) generating uniform laser gain over the AMA aperture; and 4) avoiding laser gain depletion by amplified spontaneous emission (ASE) and parasitic oscillations. The significance of these challenges and related solutions disclosed in the prior art are discussed below.

1. Concentration of Pump Radiation

Modern SSL are optically pumped by semiconductor lasers commonly known as laser diodes. Because each laser diode produces a relatively small optical output (up to a few watts), pumping of SSL for HAP requires the combined output of a great many laser diodes (typically in quantities ranging from hundreds to hundreds of thousands). For this purpose the diodes are arranged in one-dimensional arrays often called "bars" containing about 10 to 20 diodes and two-dimensional arrays often called "stacks" containing several hundred diodes. Stacks are typically produced by stacking about 10–20 bars and mounting them onto a heat exchanger. A good example of commercially available stacks is the Model SDL-3233-MD available from SDL, Inc., of San Jose, Calif., which can produce 200 $\mu$s-long optical pulses with a total output of 960 watts at a maximum 20% duty factor. SSL for HAP may require a combined power of multiple units of this type to produce desired pumping effect in the laser gain medium. Regardless of the grouping configuration, individual laser diodes emit optical radiation from a surface, which is about 1 $\mu$m high and on the order of 100 $\mu$m wide. As a result, the beamlet of radiation emitted from this surface is highly asymmetric: highly divergent in a direction of the 1 $\mu$m dimension (so called "fast axis") and moderately divergent in the transverse dimension (so-called "slow axis"). This situation is illustrated in FIG. 2. Typical fast axis divergence angles (full-width at half-maximum intensity) range from 30 to 60 degrees, while slow axis divergence angles typically range from 8 to 12 degrees. Optical radiation from an array of diodes has similar properties. High divergence in the fast axis makes it more challenging to harness the emitted power of diode arrays for use in many applications of practical interest. Some manufacturers incorporate microlenses in their laser diode arrays to reduce fast axis divergence to as little as a few degrees. An example of such a product is the lensed diode array Model LAR23P500 available from Industrial Microphotonics Company in St. Charles, Mo., which includes microlenses which reduce fast axis divergence to less than three degrees.

The intensity of the optical output of diode arrays (lensed or unlensed) is frequently insufficient to pump a SSL gain medium to inversion, and the radiation must therefore be further concentrated. In previously developed systems, optical trains with multiple reflecting and/or refracting elements have been used. See, for example, F. Daiminger et al., "High-power Laser Diodes, Laser Diode Modules And Their Applications," SPIE volume 3682, pages 13–23, 1998. Another approach disclosed by Beach et al., in U.S. Pat. No. 5,307,430 uses a lensing duct generally configured as a tapered rod of rectangular cross-section made of a material optically transparent at laser pump wavelength. Operation of this device relies on the combined effect of lensing at the curved input surface and channeling by total internal reflection. Light is concentrated as it travels from the larger area input end of the duct to the smaller area exit end. Yet another approach for concentrating pump radiation disclosed by Beach et al. in U.S. Pat. No. 6,160,939 uses a combination of a lens and a hollow tapered duct with highly reflective internal surfaces.

2. Thermal Control of Disk Perimeter

The surfaces of the laser gain medium that receive pump radiation are susceptible to overheating and, as a result, to excessive thermal stresses. Experience with end-pumped rod lasers shows that a composite rod having a section of doped and undoped laser material provides improved thermal control and concomitant reduction in thermal stresses. See, for example, R. J. Beach et al., "High-Average Power Diode-pumped Yb:YAG Lasers," UCRL-JC-133848 available from the Technical Information Department of the Lawrence Livermore National Laboratory, U.S. Department of Energy. A suitable method for constructing composite optical materials of many different configurations is disclosed by Meissner in U.S. Pat. No. 5,846,634.

3. Uniform Laser Gain Across the Aperture

Due to the exponential absorption of pump radiation, portions of the laser gain medium that are closer to the pump source are susceptible to being pumped more intensely than portions that are further away. Non-uniform deposition of pump energy results in non-uniform gain. Gain non-uniformities across the laser beam aperture (normal to the laser beam axis) are highly undesirable as they lead to degradation of beam quality. In prior art devices, non-uniform pump absorption has been compensated for in a side-pumped rod laser by the gain medium being fabricated with a radially varying level of doping. An alternate approach known as "bleach-wave pumping" has been proposed by W. Krupke in "Ground-state Depleted Solid-state Lasers: Principles, Characteristics and Scaling," Opt. and Quant. Electronics, vol. 22, S1–S22 (1990). Bleach wave pumping largely depletes the atoms in the ground energy state and pumps them into higher energy states. Achieving high uniformity of gain becomes even more challenging as the incident laser beam causes saturation-induced change in the spatial distribution of gain. Thus, the weaker portions of the signal are amplified relatively more than the stronger portions because they saturate the medium to a lesser degree.

4. Amplified Spontaneous Emission (ASE)

Amplified Spontaneous Emission (ASE) is a phenomenon wherein spontaneously emitted photons traverse the laser gain medium and are amplified before they exit the gain medium. The favorable condition for ASE is a combination of high gain and a long path for the spontaneously emitted photons. ASE depopulates the upper energy level in an excited laser gain medium and robs the laser of its power. Furthermore, reflection of ASE photons at gain medium boundaries may provide feedback for parasitic oscillations that aggravate the loss of laser power. If unchecked, ASE may become large enough to deplete the upper level inversion in high-gain laser amplifiers. Experimental data suggests that in q-switched rod amplifiers ASE loss becomes significant when the product of gain and length becomes larger than 2.25, and parasitic oscillation loss becomes significant when the product is larger than 3.69. See, for example, N. P. Barnes et al., "Amplified Spontaneous Emission—Application to Nd:YAG Lasers," IEEE J. of Quant. Electr., vol. 35, no. 1 (January 2000). Continuous wave (CW) or quasi-CW lasers are less susceptible to ASE losses because their upper level population (and hence their gain) is clamped.

A traditional method for controlling ASE losses to an acceptable level is disclosed, for example, by Powell et al. in U.S. Pat. No. 4,849,036. This method involves cladding selected surfaces of the laser gain medium with a material that can efficiently absorb ASE radiation. To reduce the reflection of ASE rays at the cladding junction, the cladding material must have an index of refraction at the laser wavelength that is closely matched to that of the laser gain medium. Recently, another method for ASE loss control was introduced. In this method, ASE rays are channeled out of selected laser gain medium surfaces into a trap from which they are prevented from returning. See, for example, R. J. Beach et al., "High-average Power Diode-pumped Yb:YAG Lasers," supra.

SUMMARY OF THE INVENTION

In view of the foregoing limitations with previously developed AMAs, it is an object of the present invention to provide an active mirror amplifier (AMA) capable of operating at high-average power and good beam quality (BQ). In particular, the AMA of the present invention meets a number of significant needs:

a side-pumped AMA for a HAP;

means to avoid excessive losses to ASE and parasitic oscillations;

means for trapping ASE rays and significantly reducing feedback to parasitic oscillations;

means for concentrating pump radiation for injection into the AMA disk side;

means for concentrating pump radiation by a circular arrangement of pump sources;

means for alleviating thermal stresses and reducing the temperature near surfaces of the laser gain medium where pump radiation is injected;

means for controlling the gain profile across the AMA aperture;

means for efficient operation of an AMA-HAP with quasi-3 level laser media such as $Yb^{3+}$;

means for efficient operation of an AMA-HAP with laser media exhibiting high pump saturation intensities;

an AMA with laser diode pump means that reduces the waste heat load to the solid-state laser medium;

a relatively thin solid-state medium to allow efficient conduction of waste heat;

microchannel cooling of a support substrate for efficient removal of waste heat from the laser gain medium;

a substrate which provides rigid mechanical support for the solid-state laser medium;

the use of concentrator ducts for the delivery of pump power to the sides (edges) of the AMA laser gain medium;

a composite gain medium assembly for the delivery of pump radiation, reduced thermal distortions and reduced ASE/parasitic losses;

hydrostatic pressure means to maintain the solid-state gain medium in an optically flat condition on said substrate;

attachment means that reduce thermally-induced distortions in the solid-state gain medium;

pre-forming laser gain medium to reduce thermally-induced stresses therein;

a longer absorption path for pump radiation, which allows reducing the laser gain medium doping requirements and concomitant reabsorption losses for the gain media of 3-level lasers (e.g., Yb:YAG); and a means for pressure-balanced coolant fluid transfer to cool the laser gain medium.

The AMA of the present invention can be used as a building block for construction of laser oscillators as well as laser amplifiers. In one preferred embodiment the invention comprises a laser gain medium having a front surface, a rear surface and a peripheral edge. The rear surface is attached to a cooled support substrate. One or more sources of optical pump radiation are disposed so as to inject optical pump radiation into one or more sections of the peripheral edge of the gain medium. Optionally, an undoped optical medium may be attached to the peripheral edge of the laser gain medium inbetween the peripheral edge and one of the sources of optical pump radiation. Alternatively, the undoped optical medium may cover the entire peripheral edge of the laser gain medium.

In one preferred embodiment a plurality of hollow, tapered ducts are arranged inbetween the peripheral edge of the laser gain medium and the sources of optical pump radiation. The hollow, tapered ducts help to direct or "channel" optical pump radiation in the peripheral edge of the laser gain medium. The sources of optical pump radiation are comprised of pluralities of laser diode arrays arranged to direct optical pump radiation through the hollow, tapered ducts.

The precise shape of the laser gain medium may vary considerably, with circular, elliptical rectangular, hexagonal, octagonal and polygonal shapes all being possible. The undoped optical medium may form one or a plurality of sections circumscribing the peripheral edge of the laser gain medium. The section(s) may be secured to the peripheral edge via an optically transparent bond. Various preferred embodiments of the arrangement of the optical pump sources and the laser gain medium are disclosed.

BRIEF DESCRIPTION OF THE DRAWINGS

The various advantages of the present invention will become apparent to one skilled in the art by reading the following specification and subjoined claims and by referencing the following drawings in which:

FIG. 4 is a highly enlarged view of portion 4 of the amplifier in FIG. 3;

FIGS. 5a and 5b are side cross-sectional and front views, respectively, of the composite gain medium assembly;

FIG. 12a is a side view of a composite gain medium disk in an unconstrained condition prior to reaching an operating temperature;

FIG. 12b is a view of the composite gain medium disk of FIG. 12a in an unconstrained condition which it would otherwise assume when reaching an operating temperature, and illustrating the tensile and compressive stresses on the disk when it is unconstrained and at an operating temperature;

FIG. 12c is a view of the composite gain medium disk of FIG. 12b constrained to a flat condition while at an operating temperature, illustrating the increased tensile and compressive forces;

FIG. 12d is a side view of a pre-formed, unconstrained composite gain medium disk prior to being heated;

FIG. 12e is a view of the pre-formed composite gain medium disk of FIG. 12d after same has been heated, and illustrating the magnitudes of the tensile and compressive forces it experiences;

FIG. 12f is a side view of a composite gain medium disk in a constrained condition prior to being heated, and illustrating the tensile and compressive forces experienced by the disk; and FIG. 12g is a side view of the composite gain medium disk in a constrained orientation after being heated, and illustrating the reduction and reversal of tensile and compressive forces experienced by the disk when constrained at an operating temperature.

DETAILED DESCRIPTION OF PREFERRED EMBODIMENT

As used herein, "Laser gain medium" refers to an optical material having a host lattice doped with suitable ions, which in the present invention are pumped to a laser transition. Although the present invention is not limited to a specific lasing material or to a specific optical pump source, the preferred host lattice materials are yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, and sapphire. Suitable dopants for this lasing medium include Ti, Cu, Co, Ni, Cr, Ce, Pr, Nd, Sm, Eu, Gd, Tb, Dy, Ho, Er, Tm, and Yb. The optical pump source is selected based on the absorption characteristics of the selected laser gain medium. Preferably, semiconductor diode lasers are used for the optical pump source. InGaAs diodes are preferred for pumping of $Yb^{3+}$ ions. "Undoped optical medium" refers to an optical material which is preferably substantially free of substances that can absorb optical pump radiation. Preferably, the undoped medium is of the same host material as the laser gain medium but it is not doped. However, in some variants of the invention, undoped optical medium may be slightly doped with ioins which may absorb optical radiation at the wavelengths of the optical pump and/or the laser gain transition, but are not pumped to a population inversion. Undoped optical medium may be bonded to selected surfaces of the laser gain medium by a fusion bond, or diffusion bond, or other suitable means.

Such bond should be highly transparent at the laser wavelength as well as at pump wavelengths. The refractive index of the updoped optical medium and the bond are preferably closely matched to that of the laser gain medium. A suitable bond can be produced by fusion bonding, diffusion bonding, or optical contacting followed by heat treatment. Preferred optical contacting followed by heat treatment is, for example, disclosed by Meissner in U.S. Pat. Nos. 5,441,803, 5,563,899 and 5,846,638 and is commercially available from Onyx Optics in Dublin, Calif.

Figure 3:
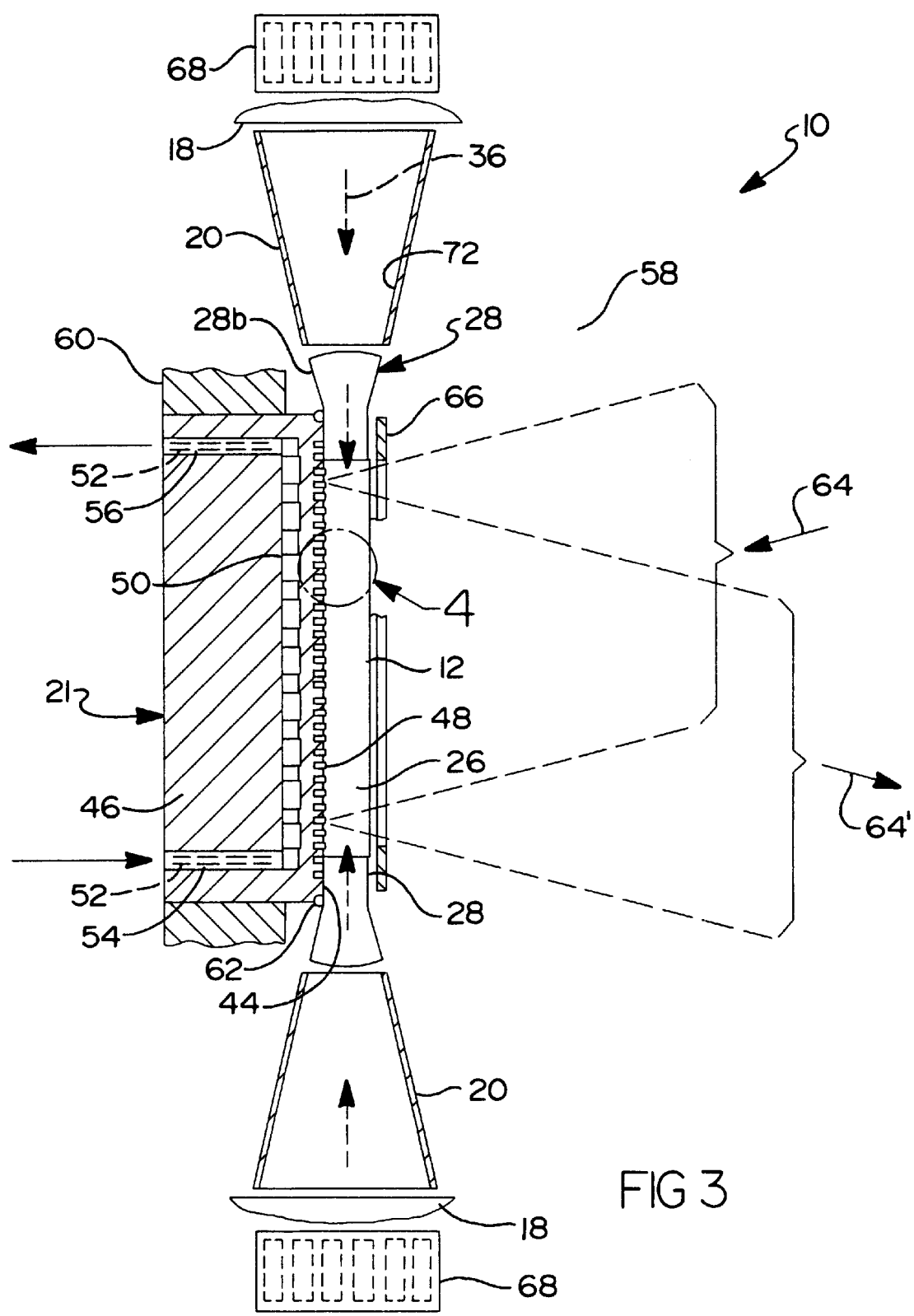
FIG. 3 is a side cross-sectional view of an active mirror amplifier module in accordance with a preferred embodiment of the present invention.
Figure 6A:
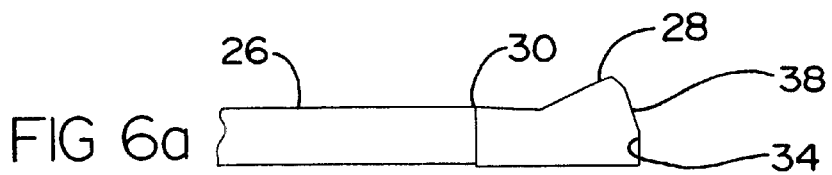
FIGS. 6a–6f are cross-sectional views of several alternative forms of undoped optical material which can be practiced with the present invention.
Figure 6B:
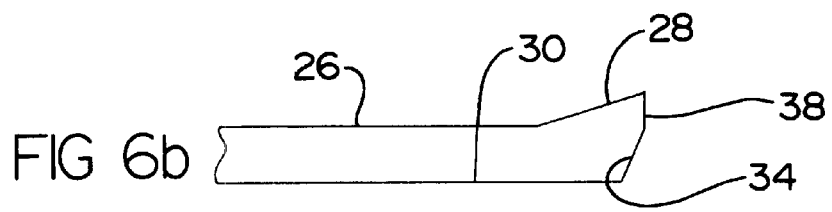
Figure 6C:
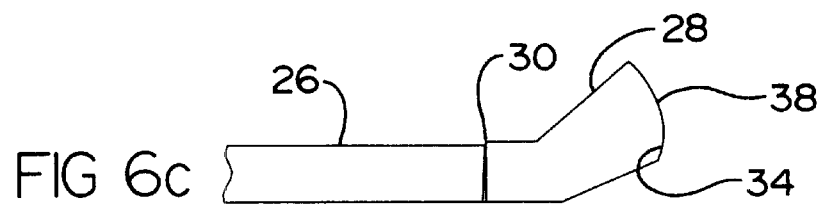
Figure 6D:
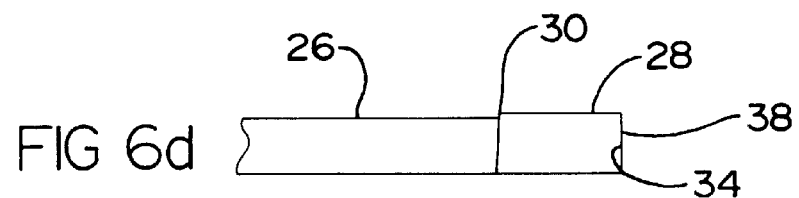
Figure 6E:
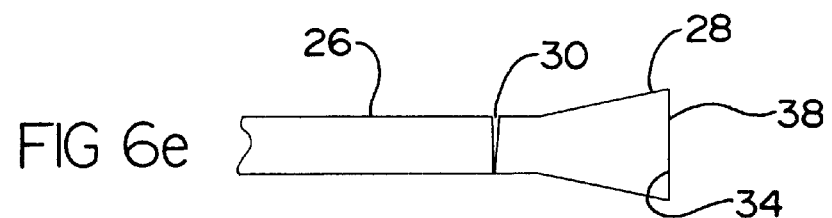
Figure 6F:
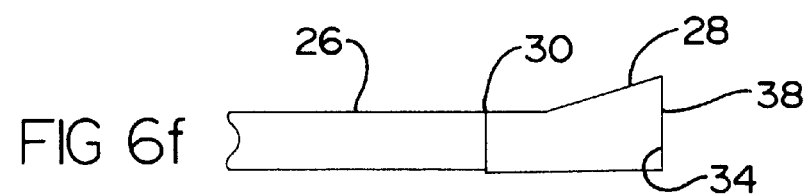

Referring to FIGS. 3 and 4, there is shown a preferred embodiment of a solid-state active mirror amplifier module 10 in accordance with a preferred embodiment of the present invention. The module 10 generally comprises a composite gain medium assembly 12, a substrate 46, optical pump sources 68, lenses 18, and tapered hollow ducts 20. The composite gain medium assembly 12 and the substrate 46 form an active mirror assembly 21.

Referring now to FIG. 5a, the composite gain medium assembly 12 has two planar, mutually parallel surfaces, a front surface 22 and a back surface 24, both being ground flat and polished to optical quality. The shape of the composite gain medium assembly 12 may vary widely but in one preferred form comprises an octogonal disk with a transverse dimension "D" several times greater than its thickness "T", as indicated in FIG. 5a. Typically, composite gain medium assembly 12 may have a thickness ranging approximately from 1 millimeter to 10 millimeters and transverse dimensions ranging from about 10 millimeters to 300 millimeters. The composite gain medium assembly 12 could just as readily be formed in other various shapes such as (but not limited to) polygonal, circular or elliptical shapes if desired. Furthermore, while the use of the term "disk" is used herein to reference this component, it will be appreciated that the composite gain medium assembly 12 may take other forms which might not be viewed, strictly speaking, as a "disk".

Referring further to FIGS. 5a and 5b, the composite gain medium assembly 12 comprises a laser gain medium 26 and eight segments 28a of undoped optical material 28. The material of the laser gain medium disk 26 comprises a suitable solid-state laser gain medium such as, but not limited to, neodymum-doped yttrium-aluminum garnet (Nd:YAG), ytterbium doped-yttrium aluminum garnet (Yb:YAG), neodymum gadolinium gallium garnet (Nd:GGG), or neodymum-doped glass (Nd:Glass) as stated above. The undoped optical medium 28 is attached around the perimeter of the laser gain medium 26 via an optical bond 30. The undoped optical medium 28 is preferably the same as the host medium used in the laser gain medium 26 but without the dopant laser ions. The optical bond 30 must be highly transparent to the optical pump radiation and laser radiation and have good thermal conductivity. A preferred method for constructing the bond 30 is the already mentioned method of optical contacting followed by heat treatment. Adjacent segments of undoped optical medium 28 do not necessarily need to be joined together. For example, FIG. 5b shows a gap 32 existing between adjacent undoped optical media 28a. Alternatively, some or all of the segments of the undoped medium can be jointed to produce an optically and mechanically monolithic unit. Surfaces 34 which receive optical pump radiation 36 (FIG. 3) have a dielectric coating 38 that is antireflective at optical pump radiation wavelengths. Furthermore, the optical bond 30 plane and (FIG. 5a) can be machined at a slight angle of 1–5 degrees off normal from surface 22 to reduce the possibility of direct ASE feedback to parasitic oscillations.

Referring now to FIG. 4, the back planar surface 24 has an optical coating 40 with high reflectivity at a laser wavelength. Such a coating can be dielectric or metallic, or a combination of several layers of metallic and dielectric coatings. The front surface 22 has an optical coating 42 that is antireflective at the laser wavelength. Optionally, the coatings 40 and 42 can also be individually made reflective at the optical pump wavelength in addition to their already mentioned properties with respect to the laser wavelength. The back surface 24 is in contact with a surface 44 of a cooled, rigid substrate 46. The surface 44 contains an array of interconnected microchannels 48 extending generally over, but not beyond, the contact area between the flat portion of composite gain medium 12 and the substrate 46.

Referring further to FIGS. 3 and 4, the substrate 46 contains a heat exchanger 50 that is located below the surface 44 and not connected to the microchannels 48. Coolant 52 is provided to the heat exchanger 50 by an inlet header 54 and drained therefrom by the outlet header 56. Internal distribution of the coolant 52 inside the heat exchanger 50 is such so as to provide a uniform cooling effect over a large part of the back surface 24 of the composite gain medium assembly 12. Suitable coolants may include liquids such as water, alcohol, members from the Freon® family, and liquid nitrogen. Preferably, coolant fluid connections to the inlet header 54 and the outlet header 56 are provided by pressure-balanced, axially-movable fluid transfer tubes such as disclosed by Eitel in U.S. Pat. No. 4,029,400, the disclosure of which is incorporated by reference herein. Such fluid transfer tubes isolate hydraulic pressure loads from the substrate 46 and coolant supply so that alignment of substrate 46 will not be affected. In addition, the fluid transfer tubes balance the hydraulic forces caused by the coolant pressure so that the substrate will not have any significant load placed upon it to interfere with its operation. Furthermore, such fluid transfer tubes permit small axial and lateral adjustments of substrate 46 such as may be required to optically align the laser gain medium 12 without affecting the operation of the fluid transfer tubes or placing forces on the substrate from the tubes.

The cooled substrate 46 is made of a material with good thermal conductivity, preferably copper, tungsten, molybdenum, sapphire, silicon carbide, silicon, but other materials with good thermal conductivity and suitable for microchannel and heat exchanger fabrication can be used. The material of the substrate 46 can also be chosen to have a coefficient of thermal expansion close to that of the laser gain medium 26. Surface 44 of substrate 46 is machined to optical flatness except for penetrations created by the microchannels 48. Typical dimensions for the microchannels 48 include a width of about 0.005 inch to 0.040 inch (0.13 mm–1 mm) and a cross sectional area of about 0.000025 inch$^2$–0.0016 inch$^2$ (0.00016125 cm$^2$–0.01032 cm$^2$). Microchannels 48 preferably occupy about 50% of the contact area between surface 44 of substrate 46 and back surface 24 of composite gain medium 12. The microchannels 48 may also be formed in a variety of cross-sectional shapes, but preferably have a generally square cross-sectional shape. The thickness of the substrate 46 is chosen to provide mechanical rigidity necessary to ensure that the surface 44 remains optically flat under operational conditions.

When optically flat surfaces are brought into contact, they may become bonded even without bonding agents. Such bonds can be attributed to Van der Vaals forces of attraction acting at opposing contact points and surfaces. Such bonding remains stable as long as the components of the composite are not subjected to temperature gradients that cause non-uniform thermal expansion, and resultant stress to overcome this bond strength. However, the bond may also be broken by inserting a strong thin object, for example a razor blade, between the optically contacted surfaces. De-bonding also results when liquids diffuse into the interface from the edge which constitutes the bond line.

In the present invention a positive contact between the back surface 24 of composite gain medium assembly 12 and surface 44 of the substrate 46 is maintained by a pressure differential between the higher pressure of the atmosphere 58 surrounding the amplifier module 10 and the lower pressure inside the microchannels 48. The microchannels 48 can be filled with either liquid (including liquid metals) or gas and are maintained at a pressure substantially lower than that of the atmosphere 58. One benefit of using liquid to fill the microchannels 48 is enhanced heat transfer due to increased thermal conductivity. The required pressure differential to maintain the surfaces 24 and 44 in contact over large portions of their areas is typically several tens of PSI. Such a continuous contact ensures that the back surface 24 will remain optically flat even when composite gain medium assembly 12 experiences significant thermal load. The continuous contact between surface 24 and surface 44 further facilitates the conductive transfer of heat from the gain medium assembly 12 to substrate 46. The substrate 46 may be further installed in an optical mount 60 to facilitate easy positioning and alignment.

Apart from the contact between the optically flat surfaces 24 and 44, which in itself provides a good seal, the atmosphere 58 can be further sealed from the microchannels 48 by an elastomeric seal 62 between the perimeter of the contact surface of composite gain medium assembly 12 and the surface 44. Seal 62 may also hold the composite gain medium assembly 12 to the substrate 46 in the absence of a pressure differential, such as during non-lasing conditions. Using a compliant seal in this area also avoids restraining of the composite gain medium assembly 12 from thermal expansion during lasing and reduces thermal stresses therein. Suitable materials for the elastomeric seal 62 include RTV® silicon rubber. Other forms of compliant seals such as an O-ring may also be used. Thermal damage to the seal 62 potentially caused by a misalignment of incident laser beam 64 (FIG. 3) is prevented by a collimator 66, which preferably absorbs laser radiation incident on the edge of the laser gain medium 26. The collimator 66 may incorporate suitable cooling means to dissipate absorbed heat.

Referring further to FIGS. 3 and 4, during lasing, optical pump source 68, which preferably comprises an array of laser diodes, produces and directs optical pump radiation 36 into cylindrical lenses 18. The cylindrical lenses 18 focus the radiation into the converging hollow ducts 20. Internal surfaces 72 of the ducts 20 are made highly reflective to the optical pump radiation. Aided by reflections from surfaces 72, the optical pump radiation 36 gradually increases in intensity as it progresses towards the tapered end of the duct 20. Optical pump radiation 36 exiting the tapered end of the duct 20 enters the undoped optical medium 28 and it is transmitted therethrough into the laser gain medium 26. Tapered portion 28b (FIG. 5a) of the undoped optical medium 28 acts as a continuation of the duct 20 and further concentrates and channels pump radiation into the laser gain medium 26. Upon entering laser gain medium 26, pump radiation is channeled in a direction generally parallel to the surfaces 22 and 24 by multiple internal reflections therefrom. During passage through the laser gain medium 26, the optical pump radiation 36 is gradually absorbed. This absorption process follows Beer's law: $l(x)=l_0 \exp(-ax)$, where "x" is the distance into absorbing medium, "a" is the absorption coefficient, "$l_0$" is the initial intensity of pump radiation, and "l(x)" is pump radiation intensity after traveling distance "x" in the absorbing medium. Preferably, the material of laser gain medium 26 is doped with absorbing species so that 90% or more of incident pump radiation 36 is absorbed in the laser gain medium 26.

Optical radiation 36 absorbed by dopant species in laser gain medium 26 pumps the dopant species to a laser transition. This allows the laser gain medium 26 to serve as an amplifier of coherent optical radiation. The incident laser beam 64, having approximately the same footprint as the aperture in the collimator 66, is directed into the laser gain medium 26 at a generally normal incidence through front surface 22 and is amplified until it reaches the reflective coating 40. On reflection from coating 40, the laser beam passes through the laser gain medium 26 again but in a generally reverse direction. The amplified laser beam 64' exits the laser gain medium 26 in a direction generally normal to the front surface 22. Waste heat dissipated in the laser gain medium 26 is conducted to the back surface 24, through the optical coating 40, and transferred to surface 44 of the substrate 46 from which it is conducted to the heat exchanger 50.

Undoped optical material 28 serves several functions:

1) Transport of pump radiation: Undoped optical medium 28 receives concentrated optical radiation 36 from the tapered end of duct 20 and channels it into the laser gain medium 26. In this respect, the undoped optical material 28 serves as a continuation of the duct 20. Surface 34 of material 28 can be curved to provide an additional lensing effect.

2) Thermal management of perimeter of the laser gain medium 26: The undoped optical material 28 is in good thermal contact with the laser gain medium 26 and provides a heat conduction path to substrate 46. This allows it to draw heat away from the perimeter of the laser gain medium 26 which reduces thermal stresses and distortions therein.

3) Suppression of parasitic oscillations: Undoped optical medium 28 is preferably chosen to have an index of refraction closely matching that of laser gain medium 26. This allows ASE rays to cross the boundary between the two materials without significant refection. The shape of the undoped optical medium 28 can be chosen so as to trap such ASE rays and/or channel them outside the composite gain medium assembly 12. By so reducing the feedback of ASE rays from the boundary of composite gain medium assembly 12, the feedback mechanism for parasitic oscillations is largely eliminated and oscillations can be suppressed. In some forms of the invention, the undoped optical medium 28 may be also slightly doped with ions absorbing at laser gain wavelength but not absorbing at optical pump wavelengths. Absorption of ASE rays in the undoped optical medium 28 accelerates their decay.

FIG. 6 shows examples of several alternative forms of undoped optical material 28 which can be practiced with the present invention.

Figure 1:
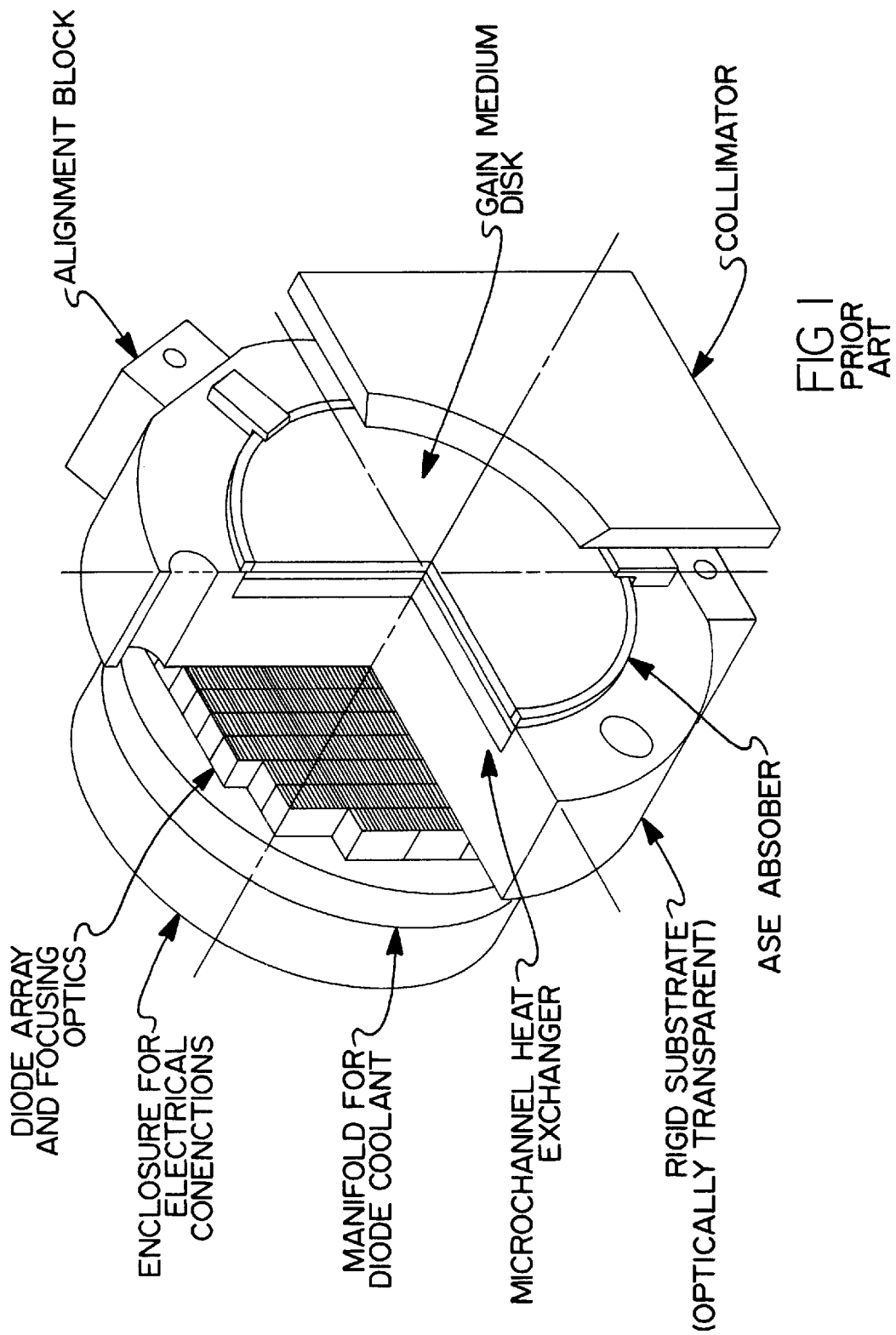
FIG. 1 is a perspective view of a prior art Active Mirror Amplifier (AMA) for high-average power.
Figure 2:
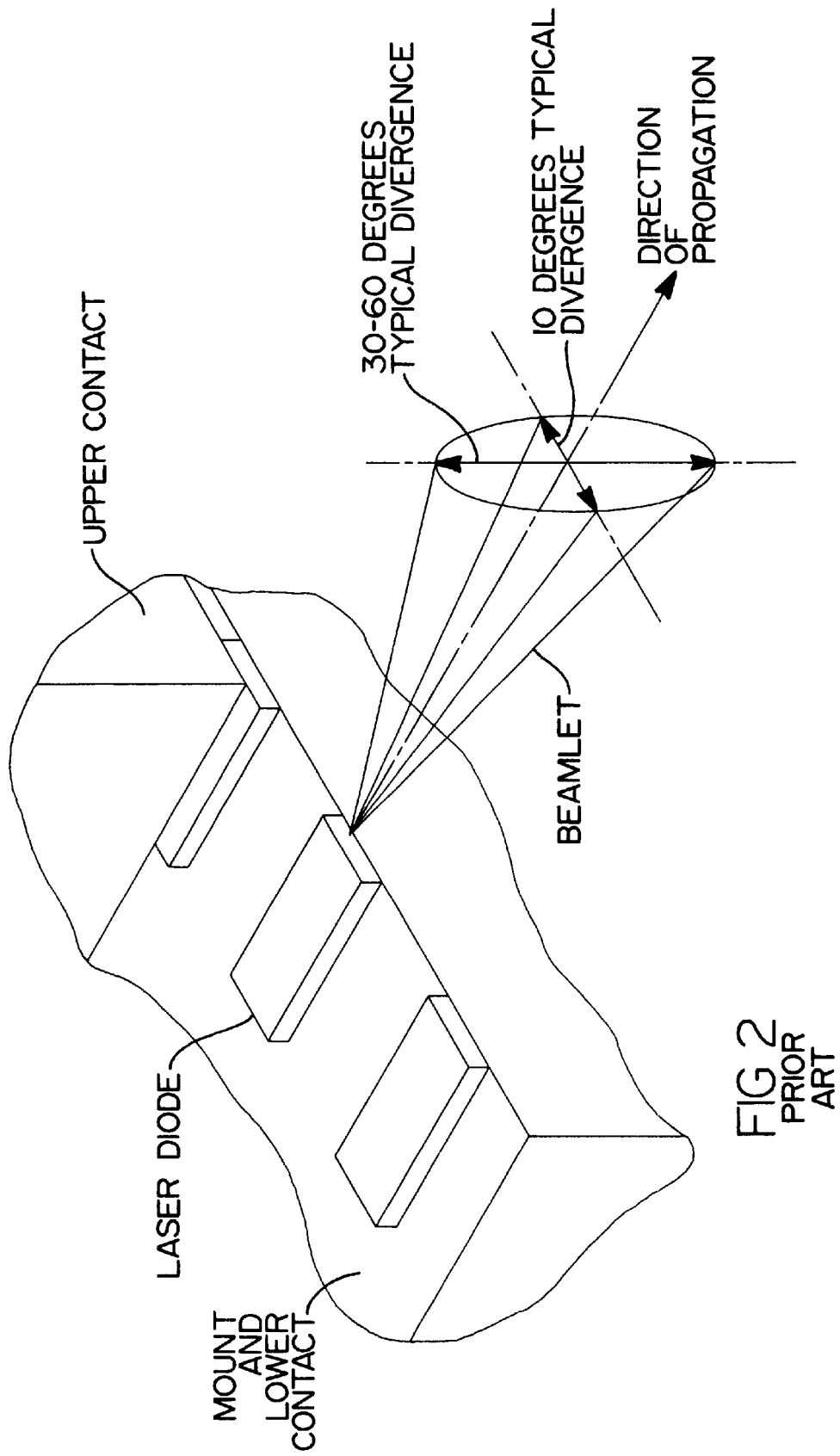
FIG. 2 is a perspective view of a prior art laser diode illustrating the divergence of a beamlet produced thereby.
Figure 7:
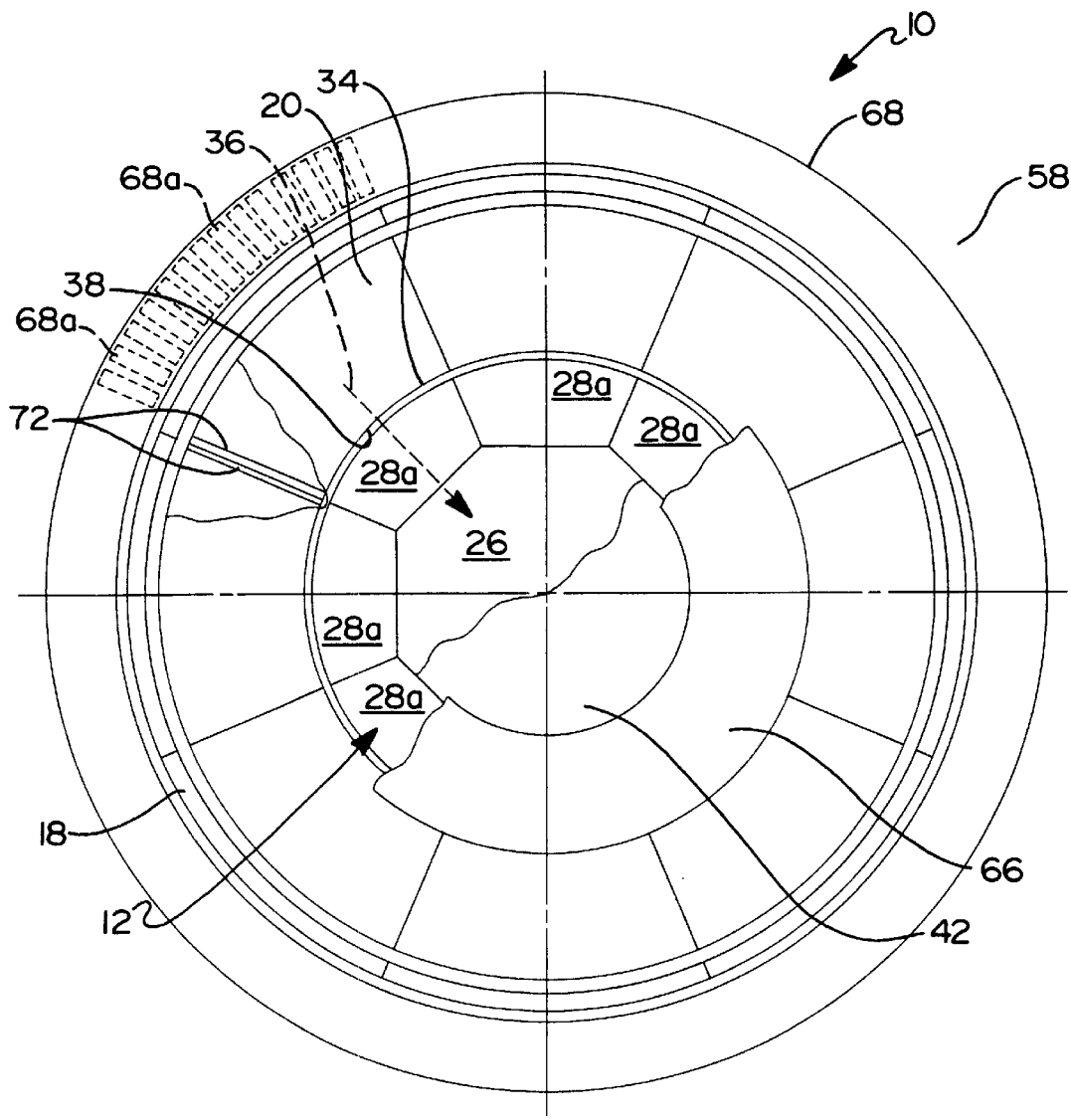
FIG. 7 is a front view of the active mirror amplifier module of the present invention.

FIG. 7 is a front view of the amplifier module 10 showing optical pump source 68, lenses 18, and tapered hollow ducts 20 providing optical pump radiation 36 into the octagonal composite laser gain medium assembly 12. The circular arrangement of pump source 68 is produced by placing laser diode arrays 68a so as to generally point toward the center of laser gain medium 26. This pump source arrangement makes it possible to achieve laser gain that is uniform across large portions of the laser gain medium 26. Beamlets produced by individual laser diode elements (as for example shown in FIG. 2) in optical pump source 68 overlap inside the laser gain medium 26 and their intensities are summed. The resulting intensity of overlapped beamlets depends on the power output and beamlet divergencies of individual diode elements of each diode array 68a, the distance of the diode elements from the center of the laser gain medium 26, parameters of the lens 18 and the duct 20, the doping density of laser gain medium 26 and the radial position (with respect to the center of laser gain medium 26) of the location where the intensity is measured.

It is a principal advantage of the present invention that a uniform gain profile is produced in the laser gain medium 26 across the aperture defined by the collimator 66. This is accomplished by choosing an appropriate combination of beamlet divergencies of individual diode elements in optical source 68, by the distance of the diode elements of each diode array 68a from the center of the laser gain medium 26, by the parameters of the lens 18 and the duct 20, and by the doping density of laser gain medium 26.

Figure 8A:
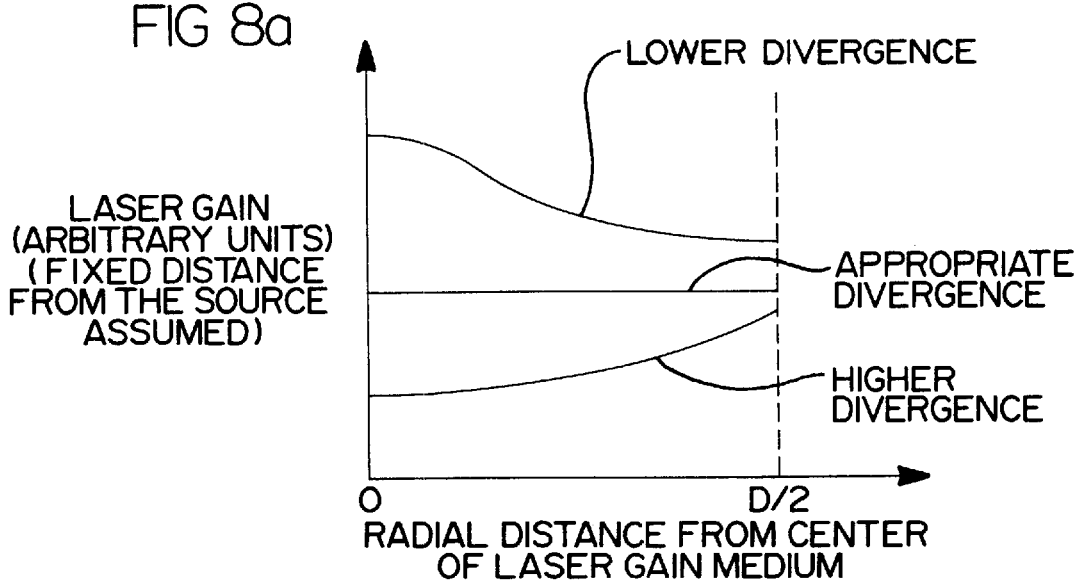
FIGS. 8a and 8b are graphs illustrating how the radial variation of small-signal gain is affected by choices of diode divergence and diode distance from the axial center of the laser gain medium.
Figure 8B:
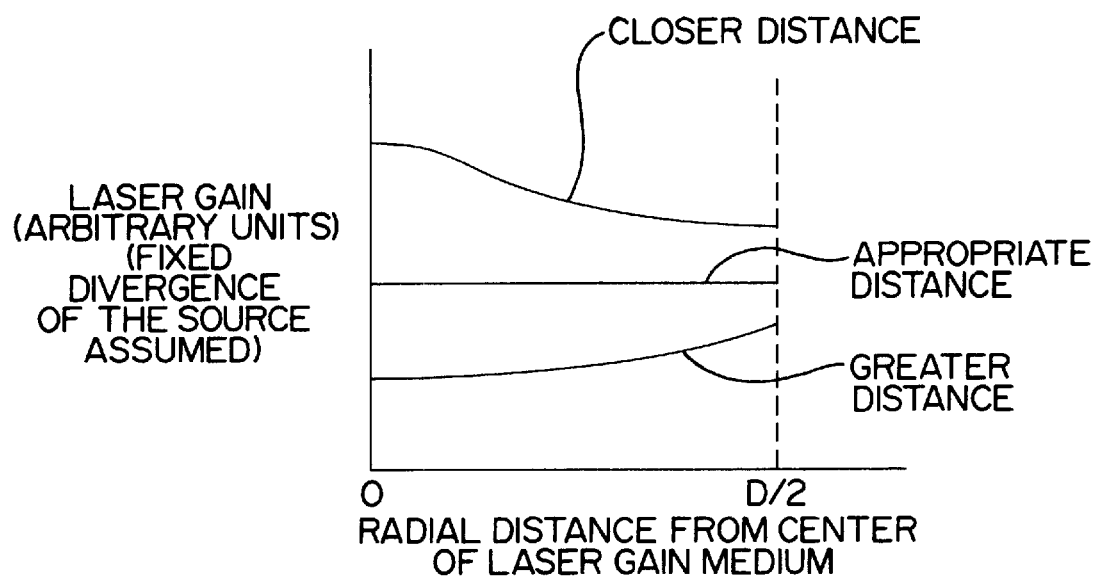

FIG. 8 shows examples of how the radial variation of small-signal gain is affected by choices of diode divergence (in the plane parallel to surface 22) and diode distance from the center of laser gain medium 26. Besides producing a uniform small-signal gain across the aperture, the present invention can also be used to provide nearly uniform gain when the medium is saturated. For example, when the invention is used to amplify laser beams with higher intensity in the central portion of the beam, the gain saturation effects near the beam center can be countered by appropriately increasing the pumping intensity (and hence small-signal gain) near the center of laser gain medium 26.

An alternate preferred embodiment of the active mirror amplifier of the present invention is suitable for operation at increased optical power density. Referring again to FIGS. 3 and 4, in the alternative embodiment, the internal heat exchanger 50 inside substrate 46 can be omitted and the coolant 52 is provided to microchannels 48 and allowed to directly wet large portions of the back surface 24 of the composite gain medium assembly 12. In this fashion, heat generated in the laser gain medium 26 is conducted through the surface 24 and the optical coating 40 directly into the coolant 52. Coolant 52 is introduced into the microchannels 48 to provide a uniform cooling effect over a large portion of the back surface 24 of the gain medium assembly 12. The pressure of coolant 52 is maintained lower than the pressure of atmosphere 58 to assure attachment of composite gain medium assembly 12 to substrate 46 as already explained above.

Figure 9:
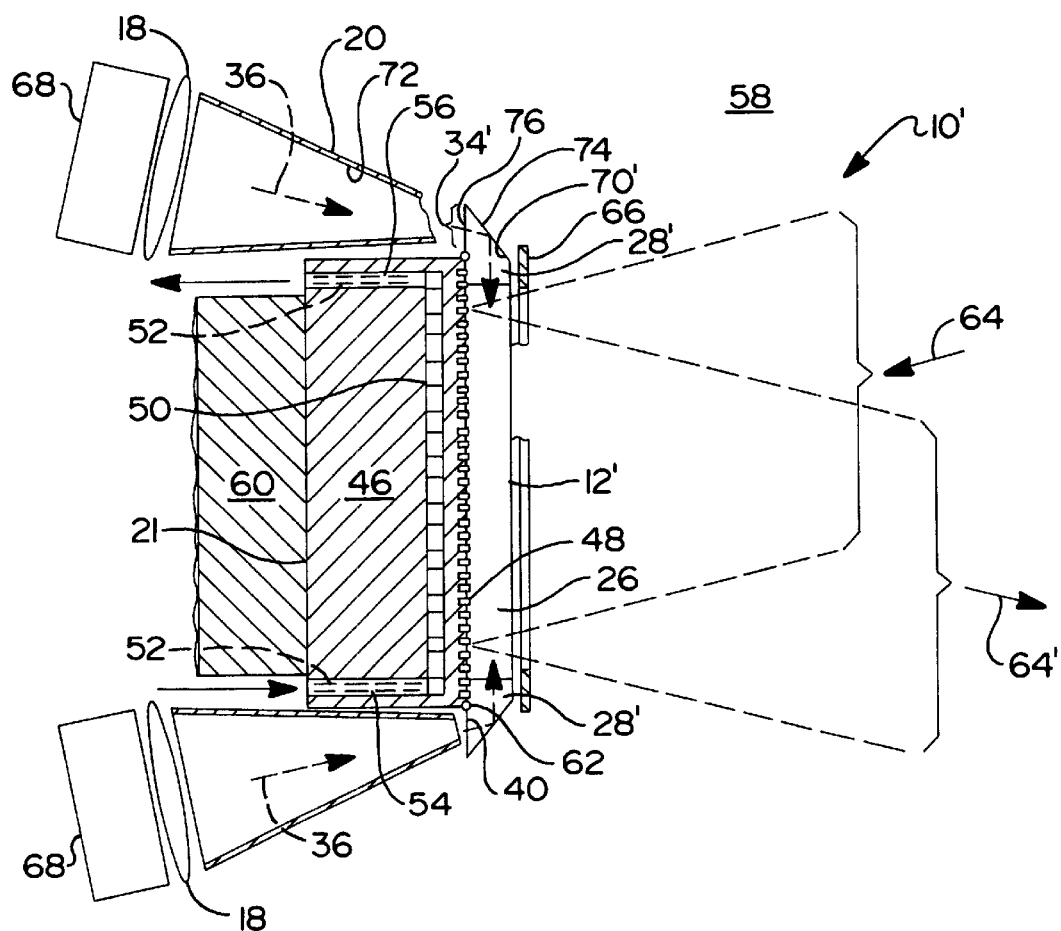
FIG. 9 is a cross-sectional view of an alternative preferred embodiment of the active mirror amplifier module of the present invention which is especially suitable for tight packaging.

Yet another alternative preferred embodiment of the active mirror amplifier of the present invention is suitable for tight packaging. FIG. 9 shows an active mirror amplifier module 10' wherein the optical pump sources 68 and the tapered hollow ducts 20 are mounted in closer proximity to the substrate 46 and optical mount 60. The composite gain medium assembly 12' incorporates undoped optical medium 28' having a surface 70' at approximately a 45 degree angle with respect to the surface 24 (FIG. 5a) of the gain medium assembly 12'. The surface 70' has a coating 74 which is highly reflective at the optical pump radiation wavelengths. Surface 34' of the undoped optical medium has a coating 76 which is antireflective at the optical pump radiation wavelengths. Optical pump radiation 36 is injected into the surface 34' and reflected from coating 74 into the laser gain medium 26.

Figure 10:
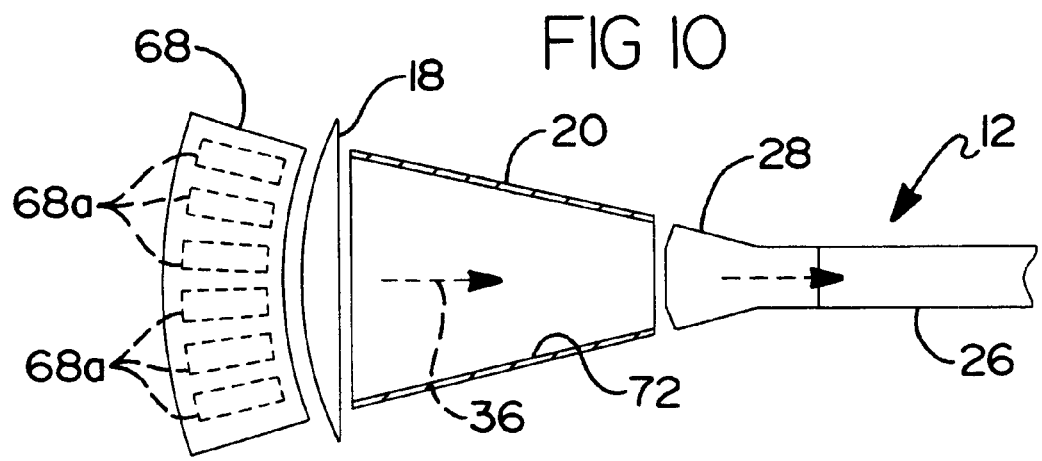
FIG. 10 is an edge view illustrating the stacking of a plurality of laser diode arrays of pump source for improved delivery of optical pump radiation into the composite gain medium.

The efficiency of concentrating pump radiation in duct 20 can be further improved by stacking laser diode arrays 68a in the plane of pump source 68 to directly point toward the surface 34 of the composite laser gain medium assembly 12 as shown in FIG. 10. This configuration of the pump source 68 also reduces the need for the lens 72 so that the lens can be omitted from the system. Furthermore, the invention can also be practiced with a solid material lensed duct such as disclosed by Beach et al. in U.S. Pat. No. 5,307,430 in lieu of the hollow duct 20. Experience shows that owing to the higher index of refraction, a solid material lensed duct can be more efficient for concentration of pump radiation. However, one drawback of the solid lensed duct in high-average power applications is that low thermal conductivity of the solid duct material (typically optical glass) makes it difficult to remove heat generated therein by pump radiation.

Figure 11:
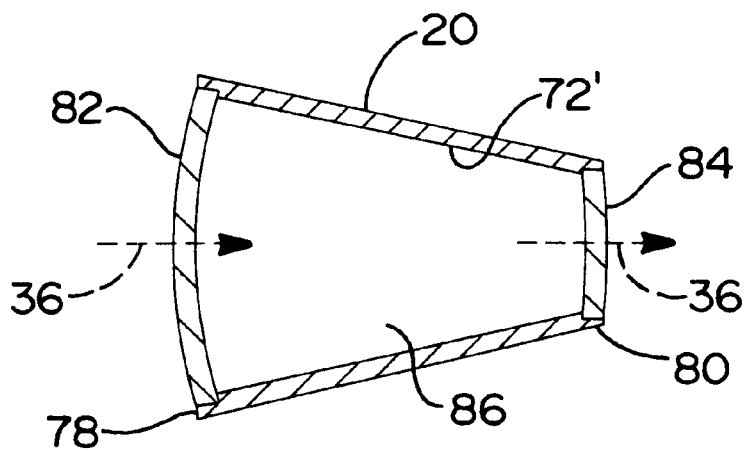
FIG. 11 illustrates a cross-sectional side view of a liquid-filled, tapered duct concentrator for directing pump radiation into the gain medium.

An alternate approach which combines the advantages of the hollow tapered duct and solid tapered duct concentrators is a liquid-filled tapered duct concentrator shown in FIG. 11. Duct walls 72' are essentially identical in shape to those of the hollow duct 20 and are coated for high reflectivity at pump radiation wavelength. A large inlet end 78 and a small outlet end 80 respectively have windows 82 and 84, the windows being made of optical material highly transmissive at pump radiation wavelength and having appropriate anti-reflection coatings. The volume enclosed by the duct walls 72' and windows 82 and 84 is filled with liquid 86 that is highly transmissive at pump radiation wavelength. Because liquids have an index of refraction substantially higher than one, the liquid-filled tapered duct will be optically similar to the above-mentioned solid tapered duct. In addition, each of the windows 82, 84 can be curved in one or two planes to provide one or two dimensional lensing effects. Overheating of liquid 86 is prevented by either internally recirculating the liquid to convect heat to the walls 72' which can be maintained at a fixed temperature. Alternately, liquid 86 can be recirculated between duct 20 and an outside heat exchanger (not shown) where heat can be rejected.

Referring now to FIGS. 12a–12g, during normal operation, the front surface 22 of composite gain medium assembly 12 is relatively hot, while back surface 24 is relatively cold. Consequently, the assembly 12 experiences very high compression near front surface 22 and very high tension near back surface 24. If the assembly 12 was unconstrained, the resulting thermal stresses would distort (dish) the medium assembly towards its cooler surface, as shown in FIG. 12b. In a constrained condition shown in FIG. 12c, the medium assembly 12 is flat but experiences increased thermal stresses.

One approach that reduces thermal stresses under operational conditions is to pre-form the composite gain medium assembly 12 as shown in FIG. 12d. Prior to laser operation, the temperature of the composite gain medium assembly 12 is uniform. When in constrained condition, material near the front surface 22 experiences tension while the material near the back surface 24 experiences compression. However, during laser operation, the front surface 22 heats up while the back surface 24 remains relatively cool. This generally relieves tension near the front surface 22 and the compression near the back surface 24. It can be shown that this approach reduces stresses in the laser medium by about 50% and allows a corresponding increase in power. The tensile and compressive stresses experienced by the laser gain medium assembly 12 when constrained and unconstrained are illustrated in FIGS. 12b, 12c, 12e, 12f and 12g. FIG. 12b illustrates the increased tensile and compressive stresses when the assembly 12 is unconstrained and FIG. 12c when it is constrained to a flat condition while at an operating temperature. FIGS. 12f and 12g illustrate the relief and possible reversal of tensile and compressive stresses when the pre-formed composite gain medium assembly 12 is constrained to a flat condition and at an operating condition.

The subject invention is not restricted to laser gain medium with planar surfaces. Surface 44 of substrate 46, nominally assumed flat in the embodiments discussed thus far, could just as well be formed to be a part of a spherical surface, or part of a surface of an ellipsoid, parabolloid, or hyperbolloid of revolution, or other suitable surface. In such case, the back surface 24 of composite gain medium assembly 12 is also formed so as to match the contour of surface 44 while maintaining uniform thickness of the laser gain medium 26.

The active mirror amplifier system of the subject invention can be operated in a thermally continuous mode where the heat deposited into the laser gain medium 26 is removed in real time, or in a semi-continuous heat capacity mode where the laser gain medium 26 is allowed to gradually warm up to a predetermined limiting temperature. In the latter mode, when the laser gain medium 26 reaches a limiting temperature, the laser operation is suspended, and the medium is allowed to cool down by transferring its thermal energy to the cooling medium 52. When the temperature of the laser gain medium 26 has been substantially reduced, lasing operation can be resumed. During the lasing operation some of the heat deposited into the laser gain medium 26 may be removed concurrently, thereby extending the lasing operation. When operated in a semi-continuous heat capacity mode, the invention can be also practiced without the substrate 46. In this case, both surfaces 22 and 24 of the have an optical coating which is antireflective at laser gain wavelength and the composite gain medium assembly 12 may be suspended by the undoped optical medium 28. Heat can be removed from the composite gain medium 12 between laser pulses for example by flowing gas over surfaces 22 and 24.

Either of the active mirror amplifier modules 10 and 10' or variants thereof can be used to construct laser amplifiers as well as laser oscillators.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A solid-state laser module for amplification of laser radiation comprising:

a substrate including a surface having a plurality of channels formed therein;

a laser gain medium having a front surface, a back surface, and a peripheral edge surface, said back surface thereof being in contact with said surface of said substrate;

an undoped optical medium attached to said peripheral edge;

a source of optical pump radiation;

said source directing optical pump radiation into said undoped optical medium;

said undoped optical medium transporting said optical pump radiation into said laser gain medium; and wherein said channels are maintained at a reduced pressure such that a pressure differential is created between said front surface of said laser gain medium and said back surface of said laser gain medium to thereby maintain said laser gain medium secured and conforming to said substrate.

2. The laser module of claim 1, wherein said laser gain medium has an optical coating on said back surface thereof to provide high reflectivity at a lasing wavelength of said laser gain medium.

3. The laser module of claim 1, wherein said laser gain medium has an optical coating on said front surface thereof for providing minimum reflectivity at a lasing wavelength of said laser gain medium.

4. The laser module of claim 1, wherein said substrate is cooled.

5. The laser module of claim 1, further comprising a cooling medium flowing through said channels for cooling said laser gain medium.

6. The laser module of claim 1, wherein peripheral edge of said laser gain medium has a shape selected from the group of shapes consisting of circular, elliptical, rectangular, hexagonal, octagonal, and polygonal.

7. The laser module of claim 1, wherein peripheral edge of said laser gain medium comprises a plurality of planar sections; and
wherein a corresponding plurality of undoped optical medium sections are secured to said planar sections via a bond which is transparent at the wavelengths of said optical pump radiation and a lasing wavelength of said laser gain medium.

8. The laser module of claim 1, wherein said undoped optical medium is secured to said peripheral edge via a bond which is transparent at wavelengths of said optical pump radiation and a lasing wavelength of said laser gain medium.

9. The laser module of claim 8, wherein said optically transparent bond is produced by optical contacting followed by heat treatment.

10. The laser module of claim 1, wherein laser gain medium has a host lattice, and wherein said host lattice and said undoped optical medium are selected from the group consisting of yttrium aluminum garnet, gadolinium gallium garnet, gadolinium scandium gallium garnet, lithium yttrium fluoride, yttrium vanadate, phosphate glass, silicate glass, and sapphire.

11. The laser module of claim 10, wherein said host lattice is doped with a material selected from the group of Ti, Cu, Co, Ni, Cr, Ce, Pr, Nd, Sm, Eu, Gd, Tb, Dy, Ho, Er, Tm, and Yb.

12. The laser module of claim 1, wherein said laser gain medium comprises $Yb^{3+}$ doped YAG, and wherein said pump laser comprises an InGaAs diode laser array.

13. The laser module of claim 1, wherein the optical pump source is comprised of at least one diode laser array.

14. The laser module of claim 1, wherein said diode laser array comprises a plurality of microlenses.

15. The laser module of claim 1, further comprising a plurality of said optical pump sources, and wherein said optical pump sources are arranged in a generally circular pattern and generally pointed towards a geometric center of said laser gain medium.

16. The laser module of claim 1, further comprising at least one tapered duct for concentration of said optical pump radiation, said tapered duct being interposed between said undoped optical medium and a source of optical radiation for directing optical pump radiation toward said undoped optical medium.

17. The laser module of claim 1, wherein said laser gain medium comprises a non-planar shape.

18. A solid-state laser module comprising:
a) a rigid substrate having a plurality of internal passages forming channels opening onto a support surface; said passages being maintained at a substantially lower pressure than an atmosphere in which said laser module is immersed;
b) a laser gain medium disposed against said support surface and having a pair of surfaces having a first dimension, said pair of surfaces further being opposite to each other and being separated by a peripheral edge surface, said laser gain medium having a thickness representing a second dimension which is substantially smaller than said first dimension;
 i) a first one of said pair of surfaces including an anti-reflection coating which is substantially totally transmissive of radiation at a wavelength at which laser gain is produced therein;
 ii) said second surface of said pair of surfaces including a coating which is substantially totally reflective of radiation at a laser gain wavelength;
 iii) said second one of said pair of surfaces being disposed against said support surface of said substrate and maintained so by a pressure differential between pressure in said passages and said atmosphere in which said laser module is immersed; and
c) a plurality of sources of optical pump radiation;
said sources arranged around said peripheral edge and directing optical pump radiation thereinto, said sources further being arranged to produce generally uniform laser gain within a volume of said laser gain medium.

19. The laser module of claim 18, wherein said pressure differential is sufficiently high for said laser gain medium to conform to the shape of said support surface.

20. The laser module of claim 18, wherein said substrate is cooled.

21. The laser module of claim 18, further comprising a cooling medium flowing through said channels for cooling said laser gain medium.

22. The laser module of claim 18, further comprising at least one lensing element disposed between at least one of said sources of optical pump radiation and said peripheral edge, said lensing element concentrating said optical pump radiation into said peripheral edge of said laser gain medium.

23. The laser module of claim 18, further comprising at least one tapered optical duct disposed between one of said sources of optical pump radiation and said peripheral edge;
said tapered optical duct concentrating said optical pump radiation into said peripheral edge of said laser gain medium.

24. The laser module of claim 23, wherein said tapered optical duct comprises a hollow tapered duct.

25. The laser module of claim 23, wherein said tapered optical duct comprises a solid tapered duct made of an optical medium highly transparent to said optical pump radiation.

26. The laser module of claim 23, wherein said tapered optical duct comprises a liquid-filled tapered duct;
said liquid being highly transparent to said optical pump radiation.

27. The laser module of claim 18, further comprising at least one undoped optical medium affixed to said peripheral edge of said laser gain medium via an optically transparent bond; and
said undoped optical medium conveying said optical pump radiation into said peripheral edge.

28. The laser module of claim 27, wherein said optically transparent bond is produced by optical contacting followed by heat treatment.

29. A solid-state laser module comprising:
- a laser gain medium having a pair of surfaces opposite to each other having a first dimension, a peripheral edge surface therebetween, and a thickness forming a second dimension substantially smaller than said first dimension; and
- a plurality of sources of optical pump radiation, said sources being arranged around said peripheral edge and directing optical pump radiation thereinto, said arrangement of said sources being chosen to produce generally uniform laser gain within a volume of said laser gain medium.

30. The laser module of claim 29, further comprising at least one lensing element disposed between one of said sources of optical pump radiation and said peripheral edge; said lensing element concentrating said optical pump radiation into said peripheral edge.

31. The laser module of claim 29, further comprising at least one tapered optical duct disposed between at least one of said sources of optical pump radiation and said peripheral edge, said tapered optical duct concentrating said optical pump radiation into said peripheral edge.

32. The laser module of claim 29, further comprising at least one undoped optical medium affixed to said peripheral edge via an optically transparent bond; said undoped optical medium conveying said optical pump radiation into said peripheral edge.

33. The laser module of claim 29, wherein said optically transparent bond is produced by an optical contacting method.

34. The laser module of claim 29, wherein said tapered optical duct comprises a hollow tapered duct.

35. The laser module of claim 29, wherein said tapered optical duct comprises a solid tapered duct made of an optical medium highly transparent to said optical pump radiation.

36. The laser module of claim 29, wherein said tapered optical duct comprises a liquid-filled tapered duct;
- said liquid being highly transparent to said optical pump radiation.

37. A laser amplifying system comprising:
- a) a rigid substrate having a plurality of internal passages forming channels opening onto one of its surfaces;
- b) a laser gain medium having a pair of surfaces having a first dimension and being separated by a peripheral edge surface, said peripheral edge surface having a thickness representing a second dimension substantially smaller than said first dimension;
  - i) a first one of said pair of surfaces including an anti-reflection coating being substantially totally transmissive of radiation at a wavelength at which laser gain is produced therein; and
  - ii) said second one of said pair of surfaces including a coating which is substantially totally reflective of radiation at said laser gain wavelength;
  - iii) said second one of said surfaces being in contact with said surface of said rigid substrate;
- c) an undoped optical medium affixed to said peripheral edge surface of said laser gain medium;
- d) a system for providing pump radiation to said undoped optical medium;
- e) a system for providing laser radiation to said laser gain medium for amplification therein;
- f) a system for maintaining fluid pressure inside said internal passages in said rigid substrate substantially lower than the fluid pressure in which the solid body is immersed, to thereby create a pressure differential between said internal passages and said laser gain medium; and
- said pressure differential being sufficient to maintain said one of said pair of surfaces of said laser gain medium in contact with said rigid substrate.

38. The laser amplifying system as defined in claim 37, wherein:
- a cooling fluid is flowed through said internal passages inside said rigid substrate; and
- said cooling fluid directly wets said surface of said laser gain medium in contact with rigid substrate to remove heat from said medium.

39. The laser amplifying system as defined in claim 37, wherein:
- heat generated in said laser gain medium is conducted across said second surface into said rigid substrate;
- said rigid substrate incorporates a plurality of cooling channels not connected to said internal passages therein; and
- a cooling fluid is flowed through said cooling channels inside said rigid substrate and removes heat therefrom.

40. The laser amplifying system as defined in claim 37, wherein:
- said first and second surfaces of said laser gain medium are planar and generally parallel when subjected to a difference in pressures between said passages of said rigid substrate and an exterior of said first surface of said laser gain medium; and
- said surface of said rigid substrate facing said laser gain medium being planar.

* * * * *